United States Patent [19]
Bouhenguel et al.

[11] Patent Number: 5,784,239
[45] Date of Patent: Jul. 21, 1998

[54] DRIVE TO LAST RECLOSURE OPERATION IN A PROTECTIVE RELAYING SYSTEM

[75] Inventors: Redjem Bouhenguel, N. Lauderdale; Walter A. Elmore, Coral Springs, both of Fla.

[73] Assignee: ABB Power T&D Company, Inc., Raleigh, N.C.

[21] Appl. No.: 539,776

[22] Filed: Oct. 5, 1995

[51] Int. Cl.$^6$ ............................................. H02H 3/00
[52] U.S. Cl. ............................................. 361/71; 361/59
[58] Field of Search ............................... 366/54, 59, 60, 366/62, 67–69, 71–75

[56] References Cited

PUBLICATIONS

ABB Power T&D Company Inc., "Line Reclosing Relay", Instruction Manual (I.L. 41–669A) Version 1.0, May 1995.
Elmore, W.A., "Reclosing and Synchronizing" pp. 333–343. No Date.

Primary Examiner—Ronald W. Leja
Attorney, Agent, or Firm—Woodcock Washburn Kurtz Mackiewicz & Norris LLP

[57] ABSTRACT

A reclosing relay in accordance with the disclosed invention comprises a reclose initiate (RI) input and a drive to last reclosure (DTLR) input, and an output at which a close signal is provided to effect the reclosure of a circuit breaker associated with the reclosing relay. The reclosing relay is operative when it receives a first RI signal at its RI input to provide the close signal to the associated circuit breaker substantially immediately or with time delay as programmed by settings. The reclosing relay is operative when it receives a signal from a second RI contact at its DTLR input to provide the close signal to the circuit breaker only after synchronism is identified between the line voltages on either side of the associated circuit breaker.

4 Claims, 2 Drawing Sheets

DRIVE TO LAST RECLOSURE OPERATION IN A PROTECTIVE RELAYING SYSTEM

FIELD OF THE INVENTION

The present invention relates generally to protective relaying, and more particularly to a reclosing relay capable of performing a drive to last reclosure (DTLR) operation.

BACKGROUND OF THE INVENTION

A reclosing relay is employed to reclose a high voltage circuit breaker after it has been tripped by a protective relay in response to a fault. The circuit breaker reclosing operation is based upon the knowledge that a high degree of probability exists that a fault on a transmission circuit is of a temporary nature, and the circuit may be re-energized successfully if sufficient time is allowed for arc deionization. For permanent faults, the breaker is closed several times to allow a small marginal improvement in service continuity that might occur. After a pre-selected number of reclosures, the reclosing relay locks out to prevent further automatic reclosures of the breaker. If any of the reclosing attempts are successful, as indicated by the lack of operation of the fault-sensing protective relays, the breaker remains closed and the reclosing relay resets in preparation for a subsequent fault. Further background information relating to the design and construction of reclosing relays can be found in chapter 15 of "Protective Relaying Theory and Applications" (Marcel Dekker, Inc., 270 Madison Avenue, New York, N.Y. 10016), which is incorporated by reference herein.

Where two breakers are associated with a given transmission line segment, such as in a ring bus or breaker-and-a-half configuration of circuit breakers, the operations of the devices associated with the given line segment must be carefully coordinated. In a system wherein each breaker is associated with two lines and each reclosing relay is associated with a single breaker (i.e., a double breaker arrangement), the protective relays monitor a transmission line current that is the sum of two currents from the two circuit breakers associated with the protected line (as shown in FIG. 1). When certain elements of the protective relaying system, particularly pilot relaying elements, operate, a reclose initiate (RI) output is produced. The RI output is input to each of the associated reclosing relays. The reclosing relays that receive two RI signals from two protective relays employ these two RI signals to identify which line has the fault and which circuit breakers will be tripped.

A strategy that can be used to clear a fault when two breakers are tripped is that one reclosing relay causes its breaker to close and, to assure that the second breaker cannot close when the fault is a permanent one, the second reclosing relay is caused to skip a reclosing shot by the RI input. If the fault is temporary, the "lead" breaker stays closed; and the "follow" breaker is then free to close by synchronism check, based upon a comparison of voltages on the two sides of the follow breaker. If the fault is permanent, the lead breaker keeps reclosing until all of its pre-set reclosing shots are completed and it assumes a lockout state. The follow breaker stays open and does not reclose in this case. For a fault on an adjacent line, the reclosing relay that was the follow breaker in the previous case now becomes the lead breaker on the basis of the particular RI inputs it receives (e.g., RI-B and RI-E, as shown in FIG. 1). In other words, the lead breaker is automatically selected on the basis of the particular RI signals received by the two reclosing breakers associated with the faulted line, and the two reclosing relays are coordinated in this way. With this process, a small number of breaker trips occur, i.e., the total number of reclose shots on the two reclosing relays are not exhausted, since the only shots executed are those set on one relay for a permanent fault.

The present invention is related to the above-described process in that the two inventions may be advantageously embodied in each of the reclosing relays of a protective relaying system.

The "drive to last reclosure" concept of the present invention and the "skip" concept described above are two methods of accomplishing a similar result. In the "skip" system, the "follow" relay remains in step with the "lead" relay. Successful reclosure (fault no longer present) after the first reclosure, for example, allows closure of the "follow" breaker to take place, based upon the shorter present timing for the second reclosing shot rather than the longer reclosing time associated with the last shot. The "skip" system may be set up for second or third reclosure based upon hot-line dead-bus (among other things) and synchronism check only for a fourth reclosure. The "drive to last reclosure" of the present invention is intended for use with synchronism-check only for the last shot.

SUMMARY OF THE INVENTION

One object of the present invention is to provide a reclosing relay, for use in a protective relaying system, having a mechanism for simplifying the coordination of multiple reclosing relays where the reclosure of one circuit breaker is to follow another. Another object of the present invention is to provide a breaker reclosing system that minimizes the number of times maintenance personnel are required to travel to a remote substation to manually close a circuit breaker in a lockout state. A still further object of the invention is to provide a system in which one simple connection to each reclosing relay is employed to achieve the above-stated objects, with no extra wiring or auxiliary switches.

One aspect of the present invention provides a reclosing relay for use in a protective relaying system for protecting plural transmission line segments. Typically, each transmission line segment is coupled at a first end to a first circuit breaker and at a second end to a second circuit breaker. A reclosing relay in accordance with the present invention comprises a reclose initiate (RI) input and a drive to last reclosure (DTLR) input, and an output at which a close signal is provided to effect the reclosure of a circuit breaker associated with the reclosing relay. The reclosing relay is operative when it receives a first RI signal at its RI input to provide the close signal to the associated circuit breaker substantially immediately. On the other hand, the reclosing relay is operative when it receives a second RI signal at its DTLR input to provide the close signal to the circuit breaker only after a predetermined sufficient degree of synchronism exists between the line voltages on either side of the associated circuit breaker. Methods by which the relay can determine whether the voltages of two line segments are in sufficient synchronism are well known to those skilled in the art. Moreover, specific criteria that may be employed to determine whether a certain degree of voltage synchronism is sufficient will depend on the application, and the present invention is not limited to any specific criterion.

Another aspect of the present invention provides a protective relaying system for protecting at least two transmission line segments. A system in accordance with the present invention comprises first, second and third circuit breakers (B2, B3, B4, as shown in FIG. 1). The first and second circuit breakers (B2, B3) are coupled to opposite ends of a first transmission line segment (A); the second and third circuit breakers (B3, B4) are coupled to opposite ends of a second transmission line segment (B), and the second circuit breaker (B3) is situated between the first and second transmission line segments. The system also comprises a protective relay (LAR) for detecting a fault on the first transmission line segment (A) and generating a reclose initiate signal (RI-A) in response thereto. In addition, the system further includes a first reclosing relay operatively coupled to the protective relay (LAR) and to the first circuit breaker (B2). The first reclosing relay comprises a reclose initiate (RI) input operatively coupled to receive the RI-A signal, and an output at which a first close signal is provided to effect the reclosure of the first circuit breaker. The system further comprises a second reclosing relay operatively coupled to the protective relay (LAR) and to the third circuit breaker (B3). The second reclosing relay comprises a drive to last reclosure (DTLR) input operatively coupled to receive the RI-A signal and an output at which a second close signal is provided to effect the reclosure of the second circuit breaker (B3). According to the invention, the first reclosing relay is operative when it receives the RI-A signal at its RI input to provide the first close signal to the first circuit breaker (B2) substantially immediately, and the second reclosing relay is operative when it receives the RI-A signal at its DTLR input to provide the second close signal to the second circuit breaker (B3) only after a predetermined sufficient degree of synchronism exists between the lines on either side of the second circuit breaker.

The present invention offers the following benefits: (1) the drive to last reclosure operation simplifies the coordination of reclosing relays in systems in which one breaker follows another; (2) the drive to last reclosure operation also prevents a need for maintenance personnel to travel to a remote substation to close a circuit breaker that would otherwise be in a lockout state; and (3) one simple connection to the reclosing relays is employed, with no extra wiring or auxiliary switches. Other features and advantages of the invention are described below.

DETAILED DESCRIPTION OF PREFERRED EMBODIMENTS

Figure 1:
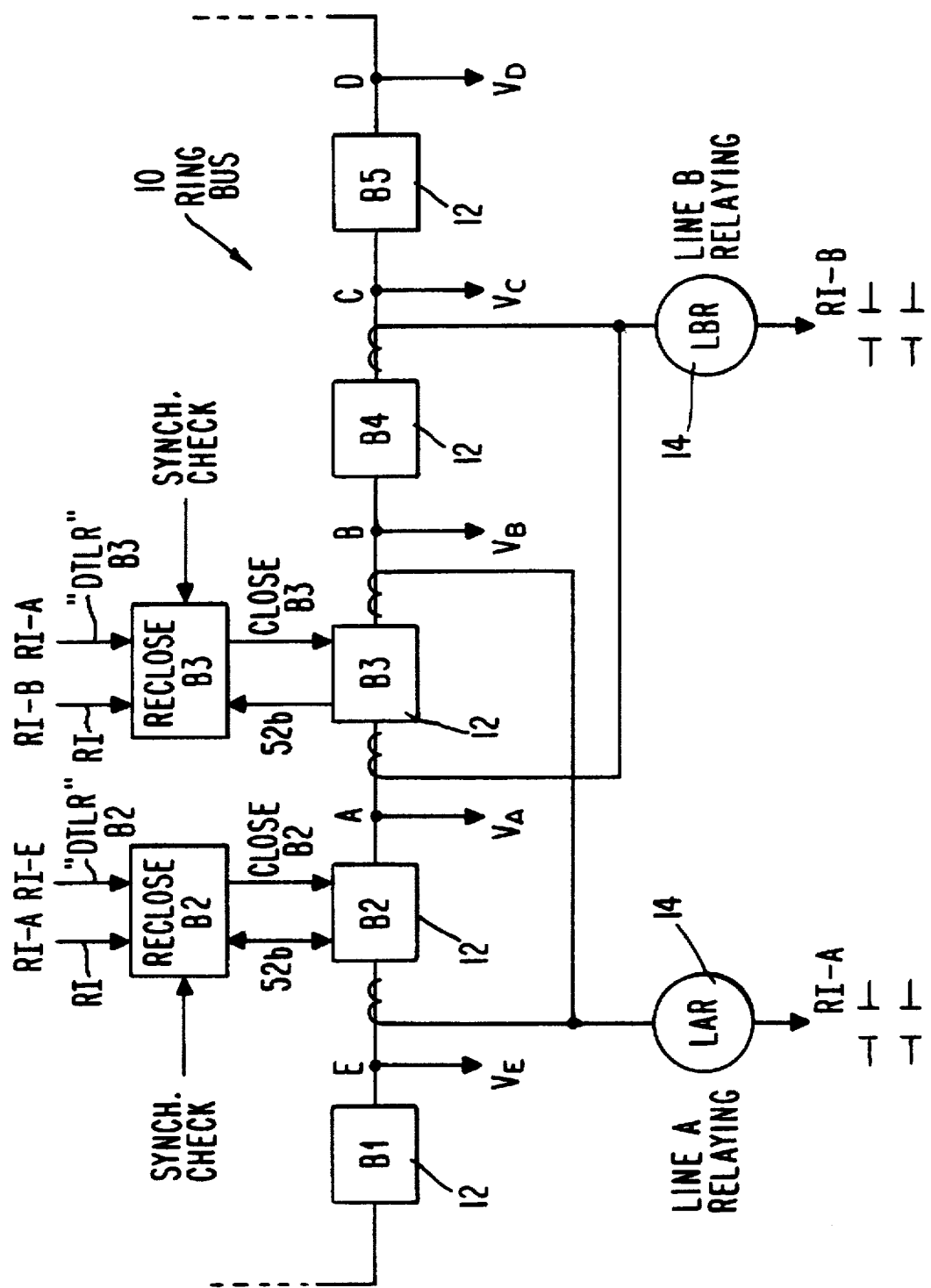
FIG. 1 schematically depicts a protective relaying system in accordance with the present invention.

FIG. 1 schematically depicts a protective relaying system in accordance with the present invention. As discussed above, to minimize the coordination requirements between any two reclosing relays, each associated with its own breaker, one reclosing relay (the "master") leads and the other relay (the "slave"), which is associated with an adjacent circuit breaker, follows. The presently preferred embodiment depicted in FIG. 1 includes a ring bus 10 and a plurality of breakers 12. In this example, five breakers B1-B5 are depicted. In addition, the system includes protective relays 14 for each line or line segment. In this example, a line "A" relay denoted "LAR" and a line "B" relay denoted "LBR" are shown, and the other relays for other line sections are omitted to simplify the drawing. The system also includes a reclosing relay 16 for each circuit breaker 12. In the example of FIG. 1, a reclosing relay for breaker B2 and reclosing relay for breaker B3 are shown. Each reclosing relay 16 includes a SYNC CHECK input; a RECLOSE INITIATE, or RI, input; a DRIVE TO LAST RECLOSURE, or DTLR, input; a 52b input; and a CLOSE output that commands the associated breaker 12 to reclose.

As shown, the reclosing relay 16 labelled "RECLOSE B2" provides a reclosing signal "CLOSE B2" to breaker B2, and the reclosing relay 16 labelled "RECLOSE B3" provides a reclosing signal "CLOSE B3" to breaker B3. The line A relay (LAR) 14 provides a RECLOSE INITIATE signal denoted RI-A to the two reclosing relays 16 associated with line A, but this signal is received at different inputs of the two reclosing relays 16. As shown, the reclosing relay 16 for breaker B2 receives the RI-A signal from the line A relay (LAR) 14 at its RI input. In contrast, the reclosing relay 16 for breaker B3 receives the RI-A signal at its DTLR input, as opposed to its RI input.

The line B relay (LBR) provides a RECLOSE INITIATE signal denoted RI-B to the reclosing relay labelled "RECLOSE B3" but not to the reclosing relay for breaker B2. As shown, the reclosing relay 16 for breaker B2 receives a RECLOSE INITIATE signal RI-E from a line E relay (not shown) at its DTLR input. The RI-B signal from the line B relay (LBR) is received at the RI input of the reclosing relay 16 for breaker B3.

As shown, each of the lines A through E provides a voltage $V_A$ through $V_E$, respectively. These voltages are employed by the respective breakers B1 through B5 in performing a "synch check" function. In particular, the reclosing relay 16 for breaker B2 employs the voltages $V_E$ and $V_A$ (the voltages on opposite sides of breaker B2) to determine whether the voltages on lines E and A are sufficiently in synchronism to allow breaker B2 to be closed. For example, when line A of the ring bus 10 is faulted, the trip relay LAR 14 trips breakers B2 and B3 simultaneously and sends the RECLOSE INITIATE signal RI-A to the reclosing relays 16 for B2 and B3. The 52b signals associated with breakers B2 and B3 are employed to indicate whether the respective breakers are open or closed, as is well known to those skilled in the art. Moreover, as noted, the RI-A signal is received at the RI input of the reclosing relay for breaker B2 and at the DTLR input of the reclosing relay for breaker B3. Assuming the reclosing relay for breaker B2 has its first reclosing shot set for RECLOSE INITIATE (i.e., internal logic examines 52b and RI-A before doing anything), it will attempt to reclose breaker B2. Since the RECLOSE INITIATE signal RI-A is input to the DTLR input of the reclosing relay for breaker B3, the relay for breaker B3 will be driven immediately to the last reclosure, where it will go through a timing action but not attempt to reclose breaker B3 until line A is successfully energized and synchronism across breaker B3 exists for a predetermined time. Breaker B3 is closed after such synchronism occurs. An important advantage of this system is that it minimizes the tripping and reclosing, and thus wear and tear, of the circuit breakers B2, B3 in a two breaker scheme and yet allows all breakers to reclose automatically for temporary faults.

The reclosing relay for the "master" or "lead" breaker (breaker B2 in the foregoing example) causes it to go through the full cycle established by its internal settings. For a permanent fault, this produces closing of the lead circuit breaker for as many shots as called for in its settings. Any closure in which the fault is not re-established allows the lead reclosing relay to reset. If the pre-selected maximum number of reclosing shots is reached and the lead relay assumes a lockout state, no further closing of the lead breaker takes place until it is closed manually (e.g., by an operator locally or by SCADA remotely). (A SCADA system is a supervisory control and data accumulation system, which allows remote control of electrically operated devices via a communication system such as wire-lines, power-line carrier, microwave, fiber optics, etc.) In the meantime, the RI inputs from the protective relays associated with the faulted transmission line section (i.e., the RI signals from LAR and LBR in the above example) cause the "follow" or "slave" reclosing relay (RECLOSE B3 in the example) to drive to its last reclosure. This condition is maintained until voltage is present on both sides of the "follow" breaker for a predetermined synchronism check time. When synchronism persists for a sufficient period, the follow reclosing relay recloses the follow breaker irrespective of the state of the lead breaker.

This method commits the "follow" or "slave" reclosing relay to a synchronism check-supervised single shot reclosure. For a fault on the line identified by the combination of RI signals from the two protective relays associated with the faulted line, the lead reclosing relay continues to reclose until reset or locked out. The follow breaker closes when synchronism exists between the voltages on the two sides of the breaker for the predetermined time, which is caused by a successful reclosure of the adjacent breaker or a remote breaker at the far end of the transmission line.

The DTLR input of each reclosing relay may also be used as a transfer trip input to the reclosing relay, which is keyed by a remote breaker failure or a remote terminal transformer failure lockout relay. As long as the remote lockout relay is operated, a communication system transmits a signal (usually a frequency shift signal) and the DTLR input to the reclosing relay is held. When this input is removed (or transferred back to guard) by the correction of the problem and resetting of the lockout relay at the remote location, the reclosing relay is then free to produce a CLOSE output, but only if synchronism exists across the breaker. This strategy can eliminate the need to send a service truck several hundred miles to have someone manually close a breaker that is not equipped with SCADA.

As mentioned, the drive to last reclosure operation is particularly useful in a ring bus or one-and-a-half breaker scheme. It is preferably implemented with an optically isolated input to the reclosing relays 16. The reclosing relay will preferably provide an alarm indicating that it is in an intermediate lockout state.

Figure 2:
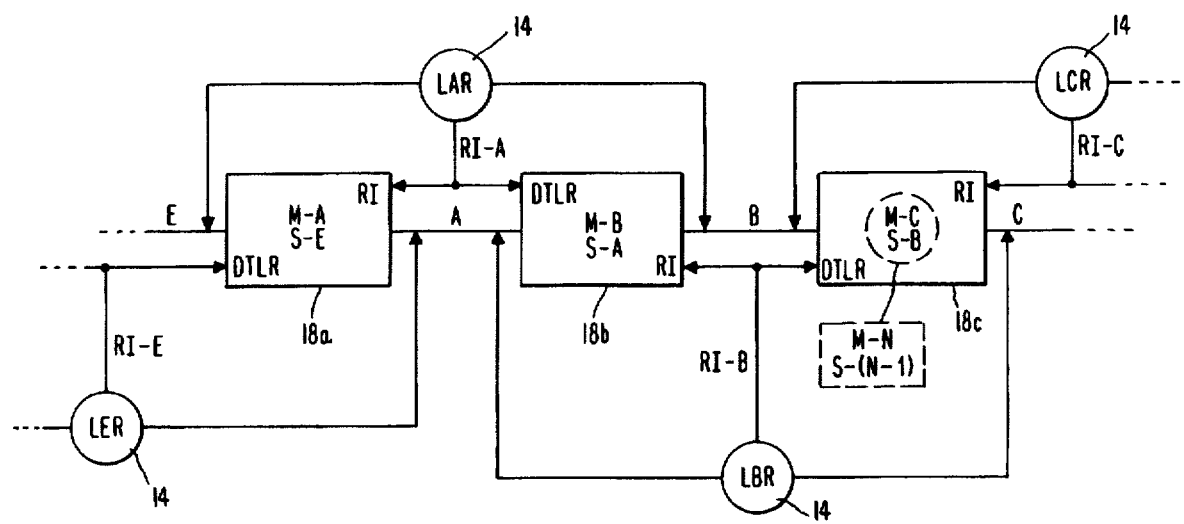
FIG. 2 is a simplified diagram of the protective relaying system of FIG. 1. This diagram stresses the master-slave relationship between adjacent pairs of reclosing relays and circuit breakers.

FIG. 2 depicts how the circuit breakers, protective relays and reclosing relays 12, 14, 16, respectively, are arranged to operate in a master-slave relationship in accordance with the present invention. In FIG. 2, each breaker 12 and its associated reclosing relay 16 is represented as a unit 18a, 18b or 18c. Units 18a, 18b and 18c correspond respectively to breakers B2, B3 and B4 and their associated reclosing relays 16. As indicated by the legend "M-A" and "S-E", unit 18a functions as a master for line A and a slave for the immediately preceding line, line E. Similarly, unit 18b operates in the role of a master for line B and a slave for the immediately preceding line, line A, as represented by the legends "M-B" and "S-A". Likewise, unit 18c serves as a master for line C and a slave for line B, as represented by the legends "M-C" and "S-B". As shown by the dashed-line box under unit 18c, this arrangement can be generalized by the notation "M-N, S-(N-1)", which means that each unit, or combination of breaker and its associated reclosing relay, functions as a master for the line immediately to its right and as a slave for the line immediately to its left. Of course, this sequence could just as well be reversed so that each combination of breaker and its associated reclosing relay functions as a master for the line on its left and as a slave for the line on its right. In either case, each unit 18a, 18b, 18c receives at its RI input the RI signal (RI-A, RI-B, RI-C, RI-E, etc.) from the protective relay 14 responsible for the line for which that unit is a master. Further, each unit 18a, 18b, 18c receives at its DTLR input the RI signal from the protective relay 14 responsible for line for which that unit is a slave.

Thus, in sum, when a unit 18a, 18b or 18c receives an RI signal (RI-A, RI-B, RI-C, RI-E, etc.) at its RI input, that unit attempts to reclose its breaker immediately. On the other hand, when a unit 18a, 18b or 18c receives an RI signal at its DTLR input, that unit attempts to reclose its breaker only after a sufficient degree of synchronism exists between the lines on either side of the breaker.

The above description of presently preferred embodiments of the invention is not intended to limit the scope of protection of the following claims. Thus, for example, except where they are expressly so limited, the following claims are not limited to processes or systems employing any particular type of reclosing relay or any particular configuration of circuit breakers and protective relays (e.g., the invention is not necessarily limited to ring bus configurations).

We claim:

1. A reclosing relay for use in a protective relaying system for reclosing plural transmission line segments, wherein each one of said plural transmission line segments is adapted to carry a voltage waveform and has first and second ends each of which is coupled to a circuit breaker, said reclosing relay being operatively associated with a particular one of said circuit breakers and comprising:

a reclose initiate (RI) input and a drive to last reclosure (DTLR) input, and an output at which a close signal (CLOSE) is provided to effect the reclosure of the particular circuit breaker associated with said reclosing relay;

wherein said reclosing relay is operative when it receives a first RI signal at its RI input to provide said close signal to the associated circuit breaker substantially immediately, and wherein said reclosing relay is operative when it receives a second RI signal at its DTLR input to provide said close signal to said particular circuit breaker only after a predetermined sufficient degree of synchronism exists between the voltage waveforms on the lines on either side of the particular circuit breaker.

2. A reclosing system for coordinating the actions of two breakers in a two breaker arrangement, comprising:

(a) first, second and third circuit breakers (B2, B3, B4), wherein said first and second circuit breakers (B2, B3) are coupled to opposite ends of a first transmission line segment (A), said second and third circuit breakers (B3, B4) are coupled to opposite ends of a second transmission line segment (B), and said second circuit breaker (B3) is situated between said first and second transmission line segments;

(b) a protective relay (LAR) for detecting a fault on said first transmission line segment (A) and generating a reclose initiate signal (RI-A) in response thereto;

(c) a first reclosing relay operatively coupled to said protective relay (LAR) and to said first circuit breaker (B2), said first reclosing relay comprising a reclose initiate (RI) input operatively coupled to receive said RI-A signal, and an output at which a first close signal is provided to effect the reclosure of said first circuit breaker; and (d) a second reclosing relay operatively coupled to said protective relay (LAR) and to said second circuit breaker (B3), said second reclosing relay comprising a drive to last reclosure (DTLR) input operatively coupled to receive said RI-A signal and an output at which a second close signal is provided to effect the reclosure of said second circuit breaker (B3);

wherein said first reclosing relay is operative when it receives said RI-A signal at its RI input to provide said first close signal to said first circuit breaker (B2) substantially immediately, and wherein said second reclosing relay is operative when it receives said RI-A signal at its DTLR input to provide said second close signal to said second circuit breaker (B3) only after a predetermined sufficient degree of synchronism exists between the lines on either side of said second circuit breaker.

3. A method for operating a protective relaying system comprising (a) first, second and third circuit breakers (B2, B3, B4), wherein said first and second circuit breakers (B2, B3) are coupled to opposite ends of a first transmission line segment (A), said second and third circuit breakers (B3, B4) are coupled to opposite ends of a second transmission line segment (B), and said second circuit breaker (B3) is situated between said first and second transmission line segments; (b) a protective relay (LAR) for detecting a fault on said first transmission line segment (A); (c) a first reclosing relay operatively coupled to said protective relay (LAR) and to said first circuit breaker (B2); and (d) a second reclosing relay operatively coupled to said protective relay (LAR) and to said third circuit breaker (B3); said method comprising the steps of:

operating said first reclosing relay when it receives a reclose initiate signal (RI-A) at a reclose initiate (RI) input to provide a first close signal to said first circuit breaker (B2) substantially immediately; and operating said second reclosing relay when it receives said RI-A signal at a drive to last reclosure (DTLR) input to provide a second close signal to said second circuit breaker (B3) only after a predetermined sufficient degree of synchronism exists between the lines on either side of said second circuit breaker.

4. A method as recited in claim 3, wherein said protective relay (LAR) detects a fault on said first transmission line segment (A) and generates the reclose initiate signal (RI-A) in response thereto; said first reclosing relay comprising the reclose initiate (RI) input operatively coupled to receive said RI-A signal, and an output at which the first close signal is provided to effect the reclosure of said first circuit breaker; and said second reclosing relay comprises the drive to last reclosure (DTLR) input operatively coupled to receive said RI-A signal and an output at which the second close signal is provided to effect the reclosure of said second circuit breaker (B3).

* * * * *